United States Patent
Chou et al.

(10) Patent No.: US 9,402,043 B2
(45) Date of Patent: Jul. 26, 2016

(54) METHOD AND SYSTEMS FOR AMPLIFYING AN OUTPUT OF A CMOS PIXEL ARRAY

(71) Applicant: Taiwan Semiconductor Manufacturing Co., Ltd., Hsin-Chu (TW)

(72) Inventors: Kuo-Yu Chou, Hsinchu (TW); Yi-Ping Chao, Zhubei (TW); Hon-Yih Tu, Hsinchu (TW); Po-Sheng Chou, Baoshan Township (TW); Yi-Che Chen, Taichung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 67 days.

(21) Appl. No.: 14/250,411

(22) Filed: Apr. 11, 2014

(65) Prior Publication Data

US 2014/0217265 A1   Aug. 7, 2014

Related U.S. Application Data

(63) Continuation of application No. 13/410,785, filed on Mar. 2, 2012, now Pat. No. 8,754,358.

(51) Int. Cl.
*H04N 5/00*   (2011.01)
*H04N 5/378*  (2011.01)
*H04N 5/365*  (2011.01)

(52) U.S. Cl.
CPC ............. *H04N 5/378* (2013.01); *H04N 5/3651* (2013.01)

(58) Field of Classification Search
CPC ... H04N 5/378; H04N 5/3559; H04N 5/3594; H04N 5/3598
See application file for complete search history.

(56) References Cited

U.S. PATENT DOCUMENTS

| 7,196,726 B2 | 3/2007 | Kokubun et al. |
| 7,402,812 B2 | 7/2008 | Hornig |
| 7,825,469 B2 | 11/2010 | Abadeer et al. |
| 8,089,530 B2 | 1/2012 | Mabuchi |
| 2013/0048831 A1 | 2/2013 | Bikumandia |

FOREIGN PATENT DOCUMENTS

CN   101573960 A   11/2009

*Primary Examiner* — Tony Ko
(74) *Attorney, Agent, or Firm* — Duane Morris LLP (57) ABSTRACT

A CMOS sensor includes a pixel configured to output a voltage based on incident light received by the pixel. Circuitry is coupled to the pixel and is configured to determine a reset voltage of the pixel and to select a gain level based on the reset voltage of the pixel. A gain circuit is coupled to the circuitry and is configured to set a voltage level of the gain selected by the circuitry.

20 Claims, 8 Drawing Sheets

METHOD AND SYSTEMS FOR AMPLIFYING AN OUTPUT OF A CMOS PIXEL ARRAY

CROSS-REFERENCE TO RELATED APPLICATIONS

This application is a continuation of U.S. patent application Ser. No. 13/410,785, filed Mar. 2, 2012, the entirety of which is incorporated by reference herein.

FIELD OF DISCLOSURE

The disclosed system and method relate to integrated circuits. More specifically, the disclosed system and method relate to integrated circuits for image sensors.

BACKGROUND

Complementary metal oxide semiconductor (CMOS) image sensors convert images to electrical signals. Such sensors are found in digital cameras or other electronic devices used for imaging. CMOS image sensors typically use source-followers as isolation devices. In particular, source followers are used to drive analog signals from individual pixel cells to a shared column line. However, the source followers in a pixel array do not all have the same gains, which results in an unbalanced photo response of the CMOS image sensor.

DETAILED DESCRIPTION

This description of the exemplary embodiments is intended to be read in connection with the accompanying drawings, which are to be considered part of the entire written description.

Some embodiments of the improved CMOS sensor arrays described herein advantageously determine a pixel reset voltage level of a CMOS pixel and adjust a gain of the output data based on the pixel reset voltage level. In some embodiments, adjusting a gain based on a detected pixel reset voltage level reduces the source follower gain variations across the array thereby reducing fixed pattern noise ("FPN") and minimizing photo response non-uniformities ("PRNU").

Figure 1:
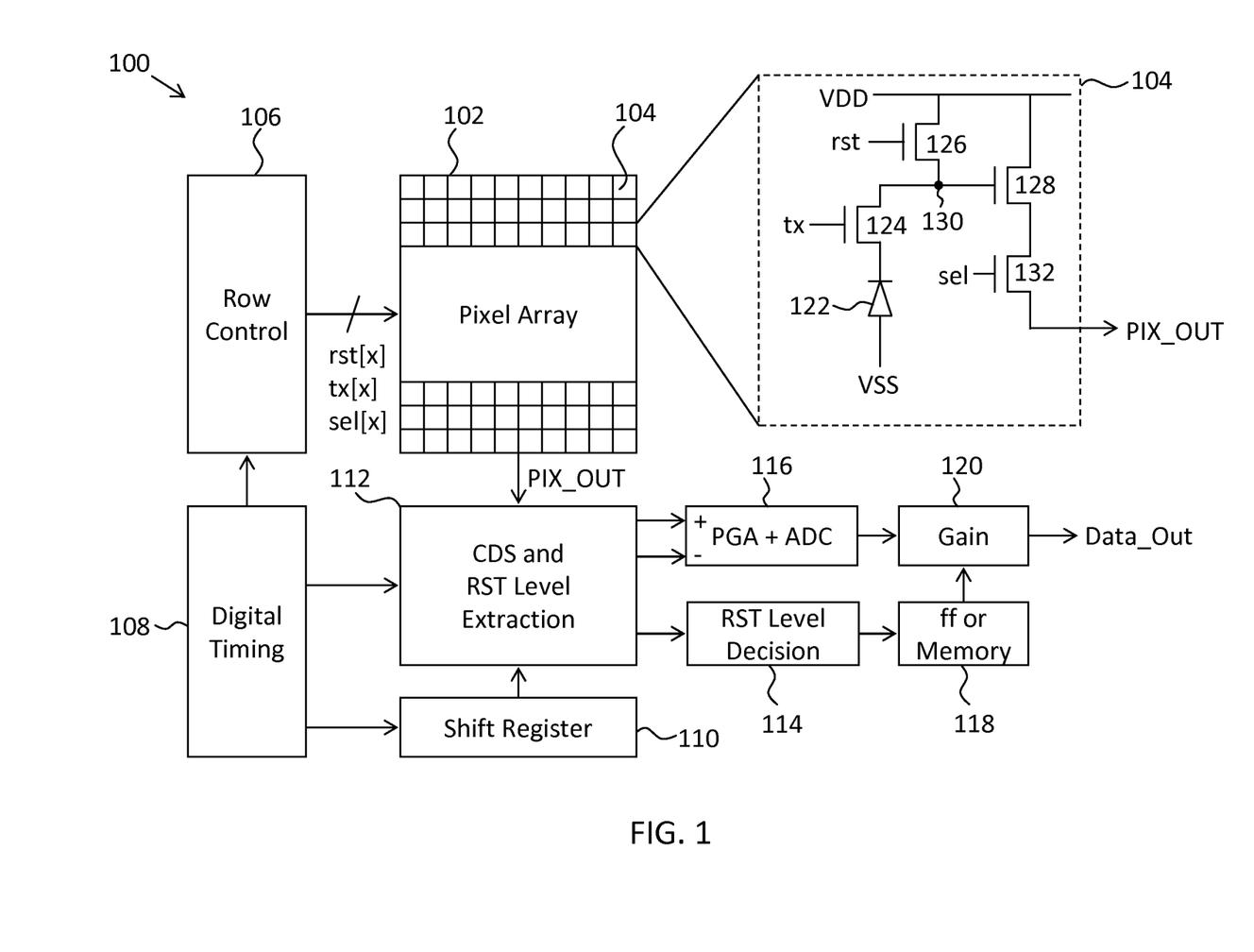
FIG. 1 is a block diagram of one example of an improved CMOS sensor array.

FIG. 1 illustrates one example of an improved CMOS imaging device 100 comprising an array 102 of CMOS pixels 104. A row control circuit 106 provides control signals, such as a reset signal, rst[x], tx[x], and a row selection signal, sel[x], to pixel array 102 for controlling the reading out of data from array 102. Array 102 is coupled to a row control circuit 106, which receives timing signals from digital timing circuit 108. Timing circuit 108 also provides timing signals to shift register 110 and to a correlated double sampling ("CDS") and reset level ("RST") extraction circuit 112, which determines the DC input level to the source-follower transistor 128.

CDS and RST level extraction circuit 112 is configured to receive pixel output signals, PIX_OUT, from pixel array 102 and output signals to a reset level decision circuit 114 and to programmable gain amplifier ("PGA") and analog to digital converter ("ADC") circuit 116. Reset level decision circuit 114 outputs the RST level to a flip-flop ("ff") or a memory 118. Both the PGA and ADC circuit 116 and the ff or memory 118 output signals to a gain circuit 120, which outputs a data output signal, Data_Out.

As shown in the inset of FIG. 1, pixel 104 includes a photodiode 122 configured to output an analog signal in response to receiving incident light. Diode 122 is coupled to a transistor 124, which is illustrated as an NMOS transistor, having its gate coupled to receive the tx signal from row control circuit 106. Transistor 124 is coupled to transistors 126 and 128 at node 130. Transistor 126 has its source coupled to a high voltage power supply, which may be VDD, its gate coupled to receive a reset signal, rst, from row control circuit 106, and its drain coupled to node 130. Source follower transistor 128 has its drain coupled to the high voltage power supply, its gate or input coupled to node 130, and its source coupled to transistor 132. Transistor 132 has its gate coupled to receive selection signal, sel, from row control circuit 106 such that transistor 132 selectively outputs the output signal, PIX_OUT. The output signal, PIX_OUT, is provided to CDS and RST level extraction circuit 112.

Figure 2:
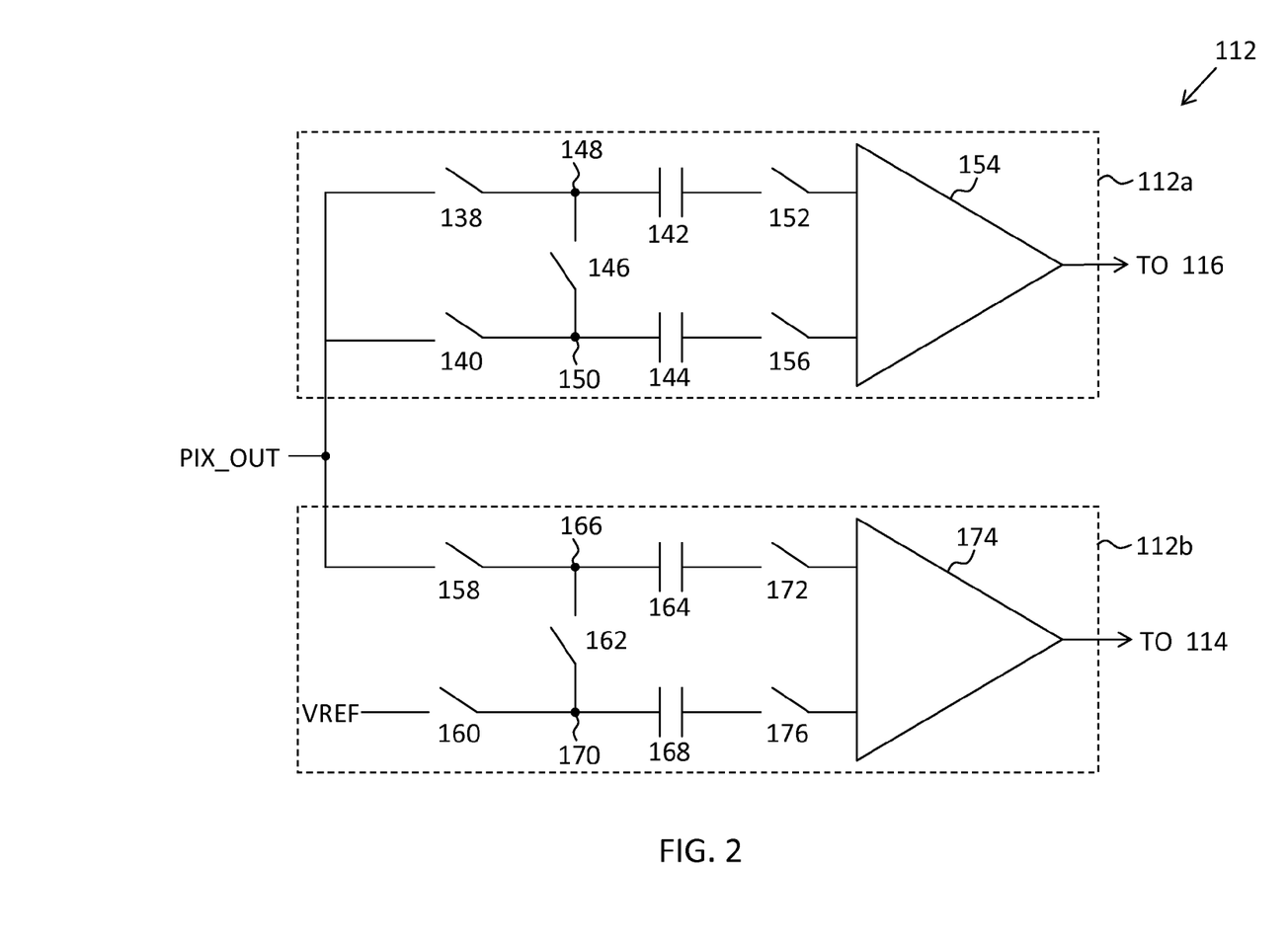
FIG. 2 is a circuit diagram of one example of a CDS and reset level extraction circuit in accordance with the CMOS sensor array illustrated in FIG. 1.

FIG. 2 illustrates one example of CDS and RST level extraction circuit 112. As shown in FIG. 2, CDS and RST extraction circuit 112 includes a CDS portion 112a and an RST extraction portion 112b that both receive the PIX_OUT signal from array 102. CDS portion 112a includes a pair of parallel switches 138 and 140, which receive the PIX_OUT signal and are respectively coupled to capacitors 142 and 144. Switch 146 is coupled to node 148, which is disposed between switch 138 and capacitor 142, and to node 150, which is disposed between switch 140 and capacitor 144. Capacitor 142 is coupled to switch 152, which is also coupled to an input of a differential amplifier 154. Capacitor 144 is coupled to switch 156, which is coupled to a second input of amplifier 154. Amplifier 154 is coupled to output a signal to PGA and ADC circuit 116 in which the noise. The signal output from amplifier 154 has a voltage equal to a difference between a pixel reset level and a pixel signal level.

RST extraction portion 112b includes a pair of parallel switches 158 and 160. Switch 158 is coupled to receive the PIX_OUT signal from array 102 and is coupled to switch 162 and capacitor 164 at node 166. Switch 160 is coupled to receive a reference voltage, VREF, which may be set at ground potential, VSS, or an arbitrary DC voltage. Switch 160 is also coupled to switch 162 and capacitor 168 at node 170. Capacitor 164 is coupled to switch 172, which selectively couples capacitor 164 to differential amplifier 174. Capacitor 168 is coupled to switch 176, which selective couples capacitor 168 to amplifier 174. Amplifier 174 outputs one or more signals that identify a difference between the pixel reset level and the reference voltage level to reset level decision circuit 114.

Figure 3A:
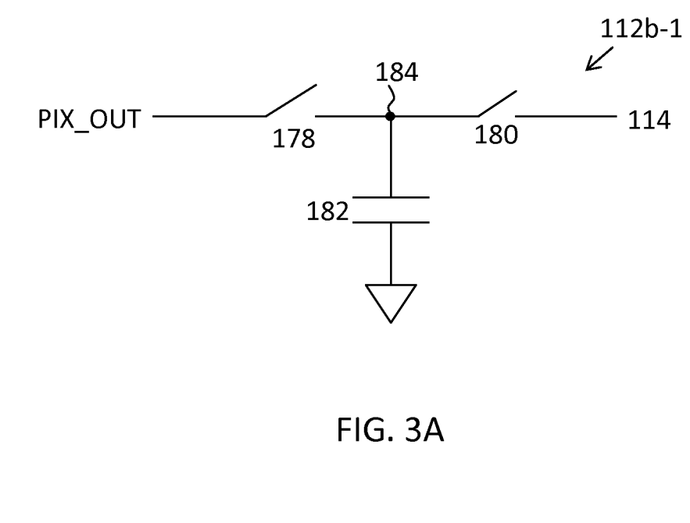
FIGS. 3A-3C illustrate various embodiments of reset level extraction circuits in accordance with the CDS and reset level extraction circuit illustrated in FIG. 2.

One skilled in the art will understand that RST extraction portion 112b may be implemented in other ways. For example, FIG. 3A illustrates another embodiment of an RST extraction circuit 112b-1 comprising a switches 178 and 180 and a comparator 182, which are all coupled together at node 184. Switch 178 is configured selectively provide the PIX_OUT signal received from array 102 to node 184. Node 184 is selectively coupled to RST level decision circuit 114 through switch 180.

Figure 3B:
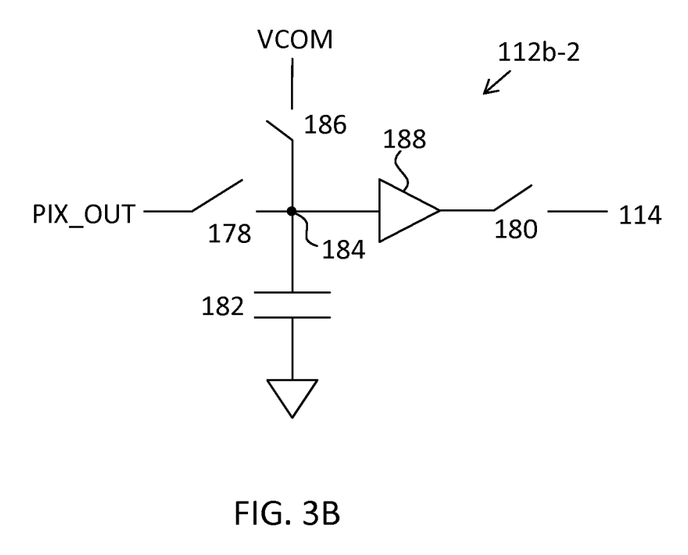

FIG. 3B illustrates another example of an RST extraction circuit 112*b*-2. As shown in FIG. 3B, the RST extraction circuit includes switches 178, 180, and 186, a buffer 188, and a capacitor 182. Switch 178 selectively provides the PIX_OUT signal received from array 102 to node 184, which is coupled to capacitor 182, an input of buffer 188, and to switch 186. Switch 186 is configured to selectively provide a common voltage, VCOM, to node 184. The output of buffer 188 is selectively provided to RST level decision circuit 114 through switch 180.

Figure 3C:
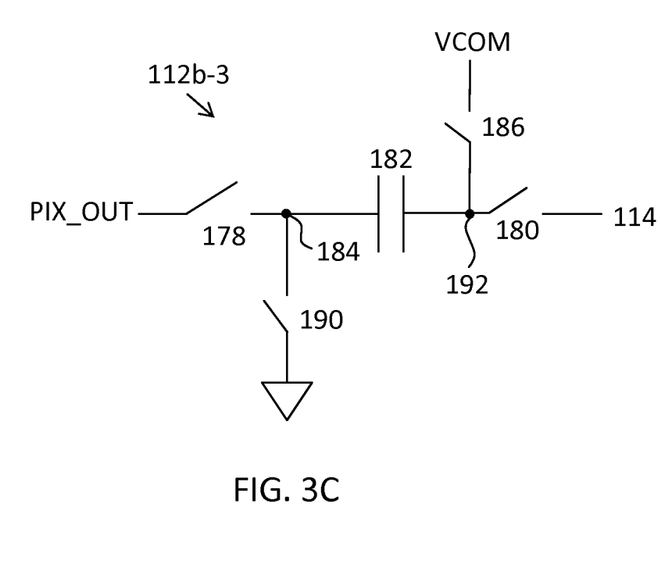

FIG. 3C illustrates yet another embodiment of an RST extraction circuit 112*b*-3 that may be used in accordance with CDS and RST level extraction circuit 112 illustrated in FIG. 2. RST extraction circuit 112*b*-3 includes switches 178, 180, 186, and 190 and a capacitor 182. Switch 178 selectively provides the PIX_OUT signal received from array 102 to node 184, which is coupled to capacitor 182 and to switch 190. Node 190 selectively provides a low voltage power supply voltage, such as ground, to node 184. Capacitor 182 is coupled to node 192, which is coupled to switches 180 and 186. Switch 186 selectively provides node 192 with a common voltage, VCOM, and switch 180 selectively provides the voltage at node 192 to RST level decision circuit 114.

RST level decision circuit 114 is configured to receive the RST level from RST level extraction circuit 112*b* and determines the appropriate gain based on the received signal level. For example, RST level decision circuit 114 may be configured to compare the RST level signal to one or more predetermined voltage levels that are identify the processing corner of the source-follower transistor 128. In some embodiments, a first voltage threshold identifies a boundary between a slow-slow ("SS") corner and a typical-typical ("TT") corner of the source-follower transistor 128, and a second voltage threshold identified a boundary between the TT corner and the fast-fast ("FF") corner of the source-follower transistor 128.

The RST level decision circuit 114 may be configured to store a gain value in a memory, such as a flash memory, a random access memory ("RAM"), or other memory based on the level of the RST level signal to compensate for signal latency due to analog to digital conversion. For example, if the RST voltage level identifies that the source-follower transistor 128 operates in the SS corner, then RST level decision circuit 114 may store a value in memory that corresponds to a high-gain value, and if the RST voltage level identifies that the source-follower transistor 128 operates in the FF corner, then RST level decision circuit 114 may store a value in memory that corresponds to a low-gain value. If the RST voltage level identifies that the source-follower transistor 128 operates in the TT corner, then the RST level decision circuit 114 may store a value in memory that corresponds to a gain value that is between the high-gain value and the low-gain value. One skilled in the art will understand that RST level decision circuit 114 may be implemented as a state machine or using one or more comparators.

Figure 4:
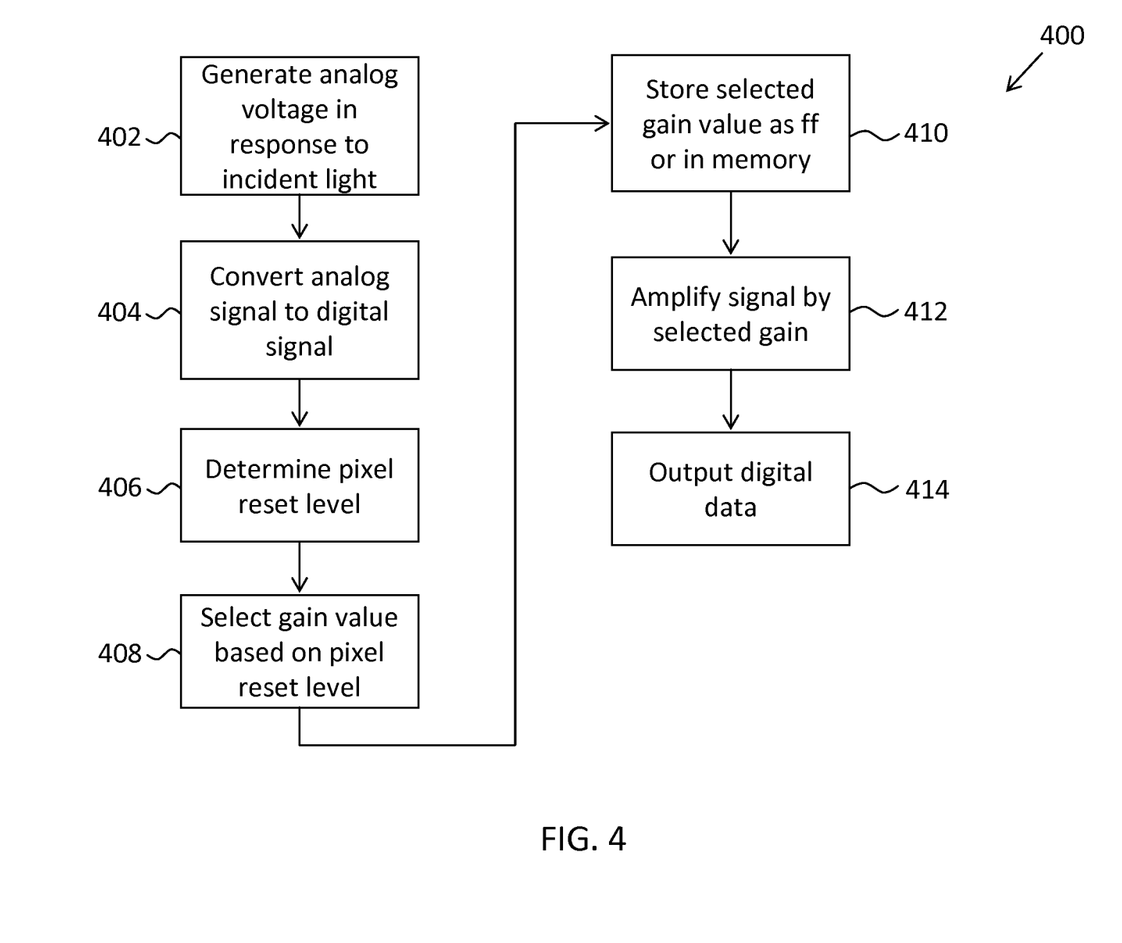
FIG. 4 is a flow diagram of one example of an improved sensing method with gain correction in accordance with the CMOS sensor array illustrated in FIG. 1.

The operation of CMOS sensor array 100 is described with reference to FIG. 4, which is a flow diagram of one example of a sensing method 400 with gain correction. At block 402, an analog signal, PIX_OUT, is output from a pixel 104 of array 102 in response to receiving incident light at photodiode 122. As will be understood by one skilled in the art, the voltage at node 130 may initially be precharged to the voltage level of supply voltage VDD. When incident light is received at photo diode 122, the voltage at node 130 drops due to charge flow within photodiode 122 producing a voltage at node 130 that is lower than supply voltage VDD.

At block 404, the analog signal from array 102 is sampled by CDS and RST level extraction circuit 112. CDS portion 112*a* of CDS and RST level extraction circuit 112 samples the PIX_OUT signal and outputs an analog signal to PGA and ADC circuit 116 having a voltage equal to the difference between the RST level, which may be stored on capacitor 142, and the pixel signal level, which may be stored on capacitor 144. As will be understood by one skilled in the art, switches 138 and 140 alternately switch such that capacitor 144 is charged with the RST level and capacitor 144 is charged with the pixel signal level having a voltage less than the RST level. RST level extraction portion 112*b* samples the PIX_OUT signal and a reference signal, VREF, and outputs a sampled analog signal to RST level decision circuit 114. The sampled signal output from RST level extraction portion 112*b* has a value equal to the pixel RST level as the reference voltage, VREF, may be set at ground potential, VSS, or a random DC voltage.

At block 406, a determination concerning the pixel RST level is made. In some embodiments, the determination concerning the pixel RST level is made by comparing the pixel RST level to one or more threshold voltages. As described above, for example, the threshold voltages may identify boundaries between the SS and TT process corners and the TT and FF process corners source-follower transistor 128 of a pixel 104. In some embodiments, blocks 404 and 406 are performed simultaneously.

At block 408, a gain value is selected based on the pixel RST level. For example, if the pixel RST level, which is based on the gain of the source-follower transistor 128, identifies that the source-follower transistor 128 of a pixel 104 is operating in the SS corner, then RST level decision circuit 114 select a high-gain value, and if the RST voltage level identifies that the source-follower transistor 128 of the pixel 104 is operating in the FF corner, then RST level decision circuit 114 may select a low-gain value. If the RST voltage level identifies that the source-follower transistor 128 of the pixel 104 is operating in the TT corner, then the RST level decision circuit 114 may select a gain value that is between the high-gain value and the low-gain value.

At block 410, the selected gain level, or a digital signal identifying the selected gain value, is stored in a flip flop or in a memory. The selected gain value is stored in a flip flop or in a memory to compensate for any latency between the signals processed by RST level decision circuit 114 and the analog to digital conversion of the PGA/ADC circuit 116.

At block 412, the digital signal output from PGA/ADC circuit 116 is amplified at gain block 120. The gain by which the digital signal is amplified is the gain value selected by RST level decision block 114 and delayed by the flip flop or by the retrieval of the value from memory. Gain circuit 120 outputs the digital data signal, Data_Out, at block 414.

Figure 5:
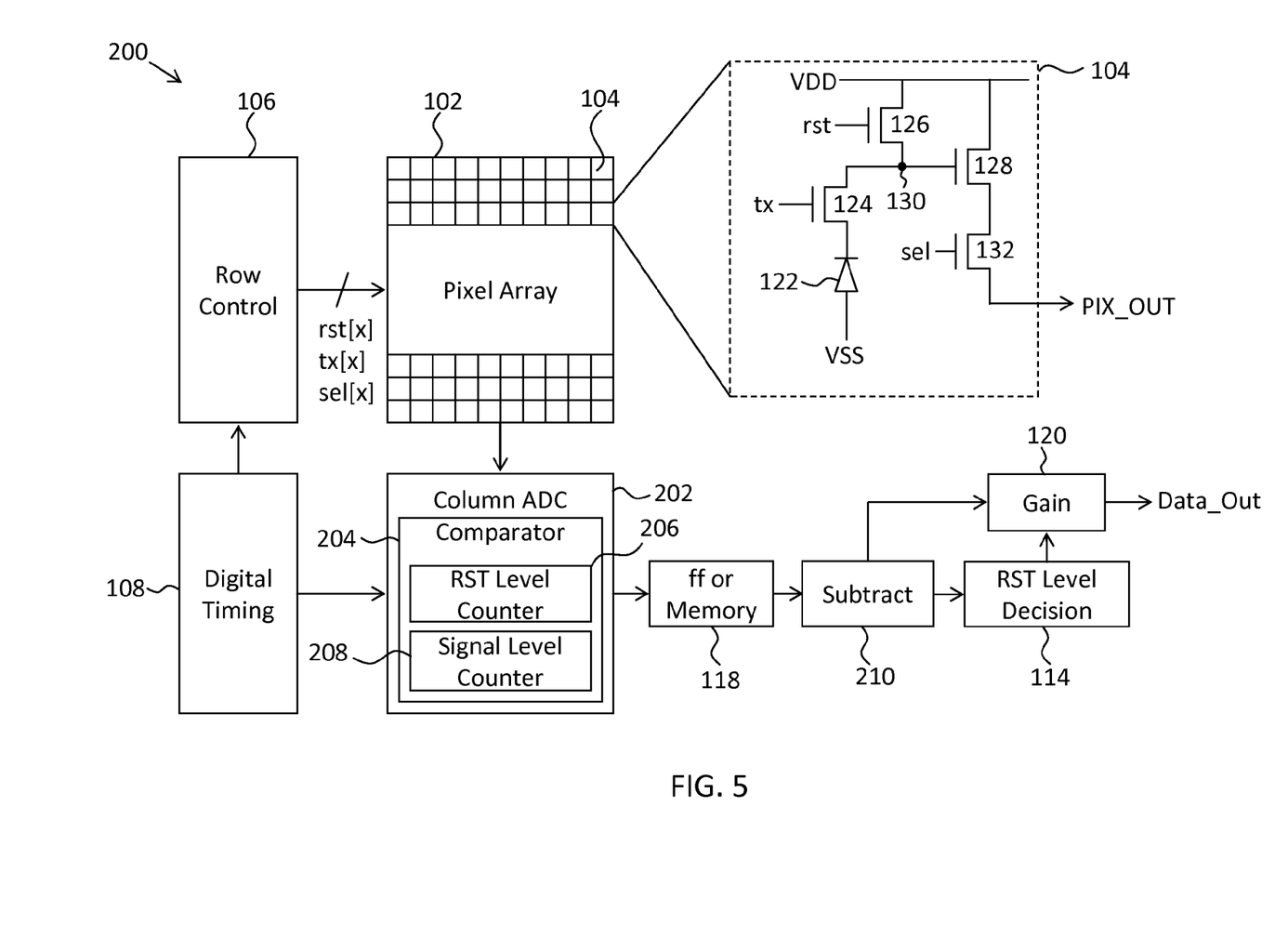
FIG. 5 is a block diagram of another example of an improved CMOS sensor array.

FIG. 5 illustrates another embodiment of an improved CMOS imaging device 200. CMOS imaging device 200 includes an array 102 of CMOS pixels 104, a row control circuit 106 for providing control signals to array 102, and a digital timing circuit 108. A column analog to digital converter ("ADC") 202 is coupled to array 102 and to digital timing circuit 108. Column ADC 202 is configured to perform analog to digital conversion for each column of pixels 104 of array 102.

Column ADC 202 also includes one or more comparators 204, RST level counters 206, and signal level counters 208. As will be understood by one skilled in the art, a comparator 204 in each column compares a ramp wave generated by a digital to analog converter (not shown) with the pixel output. RST level counters 206 and signal level counters 208 may be implemented as ripple counters configured to count the number of clock cycles between changes in the output of the column comparator 204.

The output of column ADC 202 is coupled to a flip flop or memory 118, which is configured to remove any latency due to analog to digital conversion of the voltage signal in each column. A subtraction circuit 210 is coupled to the output of the flip flop or memory 118 and is coupled to both a gain circuit 120 and a RST level decision circuit 114. Subtraction circuit 210 is configured to subtract the pixel signal level from the RST level. RST level decision circuit 114 is configured to receive the difference between the RST level and the pixel signal level and determine a gain that should be applied by gain circuit 120. The output of the gain circuit 120 is a Data_Out signal.

Figure 6:
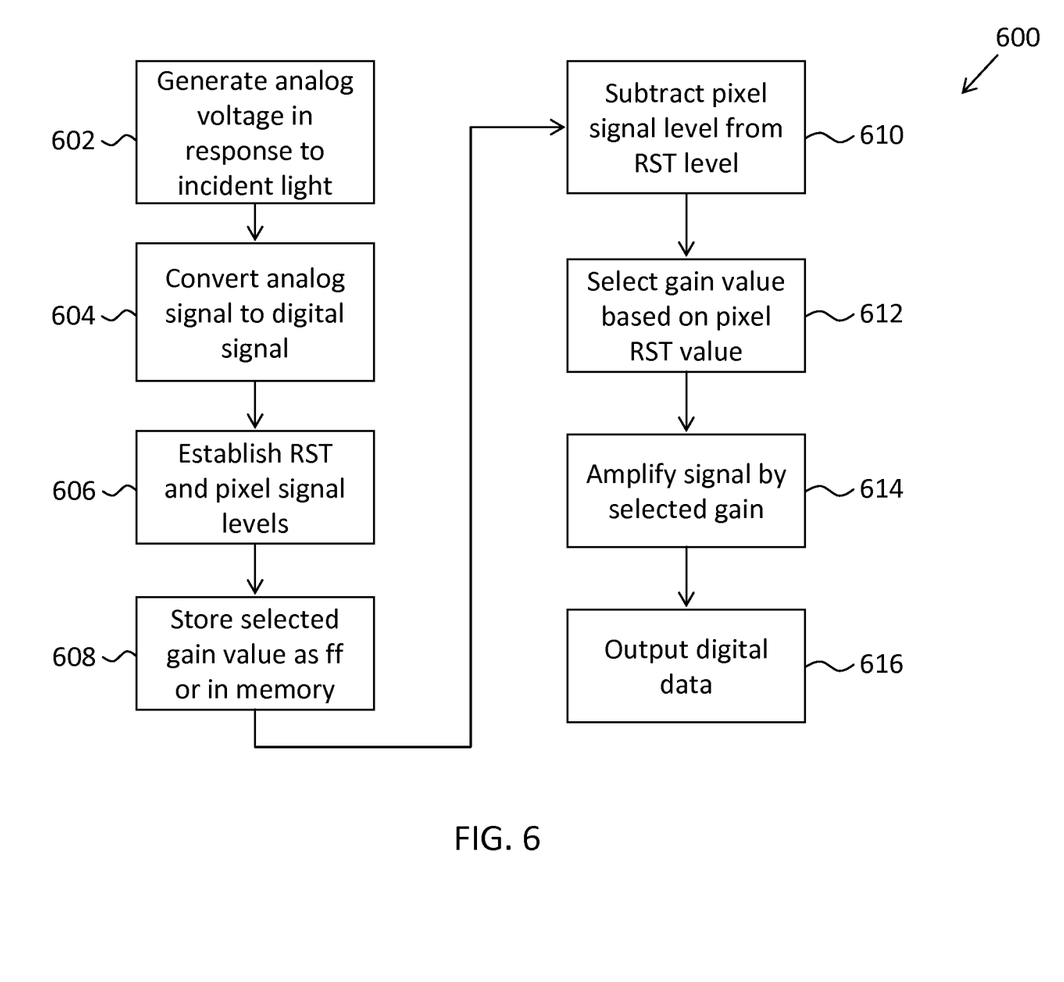
FIG. 6 is a flow diagram of another example of an improved sensing method with gain correction in accordance with the CMOS sensor array illustrated in FIG. 5.

The operation of CMOS sensor array 200 is described with reference to FIG. 6, which is a flow diagram of one example of a sensing method 600 with gain correction. At block 602, an analog signal, PIX_OUT, is output from a pixel 104 of array 102 in response to receiving incident light at photodiode 122. As will be understood by one skilled in the art, the voltage at node 130 may initially be precharged to the voltage level of supply voltage VDD. When incident light is received at photo diode 122, the voltage at node 130 drops due to charge flow within photodiode 122 producing a voltage at node 130 that is lower than supply voltage VDD. The analog signal output from pixel 104 is converted to a digital signal by column ADC 202 at block 604.

At block 606, the RST level and pixel signal levels are established. In some embodiments, the RST level is established by RST level counter 206 counting the number of clock signals between changes in the output of comparator 204 during a first time period (e.g., a RST signal A/D conversion period), and the pixel signal level is established by pixel level counter 208 by counting the number of clock cycles between changes in the output of comparator 204 during a second time period (e.g., a data A/D conversion period). The RST level value and pixel signal value may be stored in a flip flop or in a memory 118 at block 608.

At block 610, the pixel signal level is subtracted from the RST level at subtraction circuit 210. The RST level is used by RST level decision circuit 114 to determine an appropriate gain at block 612. In some embodiments, the pixel RST level is determined by comparing the pixel RST level to one or more threshold voltages. As described above, for example, the threshold voltages may identify boundaries between the SS and TT process corners and the TT and FF process corners source-follower transistor 128 of a pixel 104.

For example, if the pixel reset level, e.g., RST voltage level, identifies that the source-follower transistor 128 of a pixel 104 is operating in the SS corner, then RST level decision circuit 114 select a high-gain value, and if the RST voltage level identifies that the source-follower transistor 128 of the pixel 104 is operating in the FF corner, then RST level decision circuit 114 may select a low-gain value. If the RST voltage level identifies that the source-follower transistor 128 of the pixel 104 is operating in the TT corner, then the RST level decision circuit 114 may select a gain value that is between the high-gain value and the low-gain value.

At block 614, the digital signal output from the column ADC 202 is amplified at gain block 120. The gain by which the digital signal is amplified is the gain value selected by RST level decision block 114 and delayed by the flip flop or by the retrieval of the value from memory. Gain circuit 120 outputs the digital data signal, Data_Out, at block 616.

The improved CMOS sensor arrays described above advantageously determine a pixel reset voltage level of a CMOS pixel and adjust a gain of the output data based on the pixel reset voltage level. Adjusting a gain of a source followed based on a detected pixel reset voltage level reduces the source follower gain variations across the array thereby reducing FPN and minimizing PRNU.

In some embodiments, a CMOS sensor includes a pixel configured to output a voltage based on incident light received by the pixel. A first circuit is coupled to the pixel and is configured to determine a reset voltage of the pixel. A second circuit is coupled to the first circuit and is configured to select a gain level based on the reset voltage of the pixel. A gain circuit is coupled to the second circuit and is configured to set a voltage level of the gain selected by the second circuit.

In some embodiments, a method includes receiving an analog signal from a pixel of an image sensor, determining a reset level of the pixel, selecting a gain value based on the reset level of the pixel, and amplifying a digital data signal with the selected gain value.

In some embodiments, a CMOS sensor includes a pixel array including a plurality of pixels arranged in rows and columns. Each pixel is configured to output an analog signal in response to receiving incident light. A first circuit is coupled to at least one of the pixels of the pixel array. The first circuit is configured to determine a reset voltage of the at least one pixel. A second circuit is coupled to the first circuit and is configured to select a gain level based on the reset voltage of the pixel. A gain circuit is coupled to the second circuit and is configured to set a voltage level of the gain selected by the second circuit.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A CMOS sensor, comprising:
   a pixel configured to output an analog signal in response to incident light received by the pixel;
   circuitry coupled to the pixel and configured to determine a reset voltage of the pixel in response to receiving the analog signal from the pixel, the circuitry further being configured to select a gain level based on the reset voltage of the pixel; and
   a gain circuit coupled to the circuitry and configured to amplify a digital data signal with the selected gain level.

2. The CMOS sensor of claim 1, wherein the circuitry includes:
   a first circuit configured to determine the reset voltage of the pixel, and
   a second circuit configured to select the gain level based on the reset voltage of the pixel as determined by the first circuit.

3. The CMOS sensor of claim 2, wherein the second circuit is configured to compare the reset voltage level to at least one threshold voltage to identify a process corner in which a source-follower transistor of the pixel is operating.

4. The CMOS sensor of claim 2, wherein the first circuit includes
   a first portion configured to perform correlated double sampling of the voltage output from the pixel, and a
   a second portion configured to determine the reset voltage of the pixel.

5. The CMOS sensor of claim 4, wherein the second portion includes:
   a differential amplifier having a first input coupled to a first capacitor through a first switch, a second input coupled to a second capacitor through a second switch, and an output coupled to the second circuit;
   a third switch configured to selectively provide the voltage from the pixel to the first capacitor; and
   a fourth switch configured to selectively provide a reference voltage to the second capacitor.

6. The CMOS sensor of claim 4, wherein the second portion includes a pair of switches configured to selectively provide the voltage from the pixel to a capacitor and to the second circuit.

7. The CMOS sensor of claim 6, wherein the capacitor is coupled to ground and to a node disposed between the pair of switches.

8. The CMOS sensor of claim 2, wherein the first circuit includes
   an analog to digital converter configured to convert the voltage output by the pixel to a digital value;
   a first counter configured to measure the reset voltage; and
   a second counter configured to measure a signal voltage output by the pixel.

9. The CMOS sensor of claim 8, further comprising a subtraction circuit coupled to the first and second counters and configured to provide a difference between the signal voltage and the reset voltage to the second circuit.

10. A method, comprising:
    determining a reset level of a pixel of an image sensor in response to receiving an analog signal from the pixel;
    selecting a gain value based on the reset level of the pixel; and
    amplifying a digital data signal with the selected gain value.

11. The method of claim 10, wherein determining the reset level of the pixel includes
    sampling an output of the pixel of the image sensor during a reset period to provide a differential amplifier with a first input;
    sampling a reference voltage to provide the differential amplifier with a second input; and
    outputting the reset level of the pixel from the differential amplifier based on the first and second inputs.

12. The method of claim 10, wherein selecting the gain value includes comparing the reset level of the pixel to at least one threshold value.

13. The method of claim 10, further comprising:
    converting the analog signal to a digital signal;
    measuring a reset level of the pixel at a first digital counter during a first time period;
    measuring a signal level output by the pixel at a second digital counter during a second time period;
    subtracting the signal level from the reset level; and
    outputting the difference between the signal level and the reset level to a circuit for selecting the gain value.

14. A CMOS sensor, comprising:
    a pixel array including a plurality of pixels arranged in rows and columns, each pixel configured to output an analog voltage signal in response to receiving incident light;
    circuitry coupled to at least one of the pixels of the pixel array, the circuitry configured to determine a reset voltage of the at least one pixel and to select a gain level based on the reset voltage of the pixel; and
    a gain circuit coupled to the circuitry and configured to set a voltage level of the gain selected by the circuitry.

15. The CMOS sensor of claim 14, wherein the circuitry is configured to compare the reset voltage level to at least one threshold voltage to identify a process corner in which a source-follower transistor of the pixel is operating.

16. The CMOS sensor of claim 14, wherein the circuitry includes:
    a first portion configured to perform correlated double sampling of the voltage output from the pixel, and
    a second portion configured to determine the reset voltage of the pixel.

17. The CMOS sensor of claim 16, wherein the second portion includes:
    a differential amplifier having a first input coupled to a first capacitor through a first switch, a second input coupled to a second capacitor through a second switch, and an output coupled to the second circuit;
    a third switch configured to selectively provide the voltage from the pixel to the first capacitor; and
    a fourth switch configured to selectively provide a reference voltage to the second capacitor.

18. The CMOS sensor of claim 16, wherein the second portion includes a pair of switches configured to selectively provide the voltage from the pixel to a capacitor and to the second circuit.

19. The CMOS sensor of claim 14, wherein the circuitry includes:
    an analog to digital converter configured to convert the voltage output by the at least one pixel to a digital value;
    a first counter configured to measure the reset voltage; and
    a second counter configured to measure a signal voltage output by the pixel.

20. The CMOS sensor of claim 19, further comprising a subtraction circuit coupled to the first and second counters and configured to provide a difference between the signal voltage and the reset voltage to the circuitry.

* * * * *